April 3, 1962 H. J. ROBERTSON ET AL 3,028,243
METHOD OF TREATING MEAT AND BONE
Filed Aug. 10, 1959 7 Sheets-Sheet 2

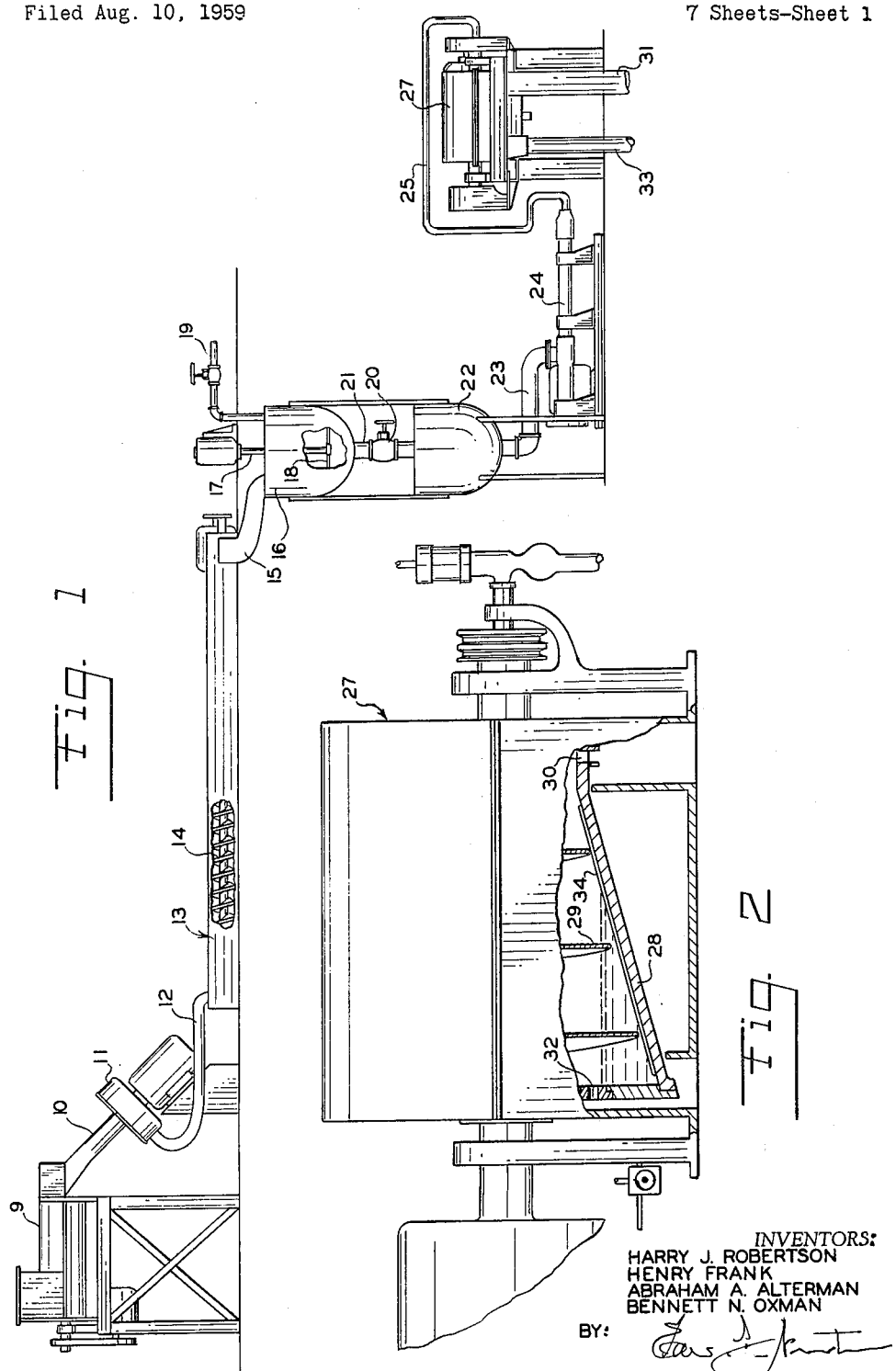

April 3, 1962  H. J. ROBERTSON ETAL  3,028,243
METHOD OF TREATING MEAT AND BONE
Filed Aug. 10, 1959  7 Sheets-Sheet 4

United States Patent Office 3,028,243
Patented Apr. 3, 1962

3,028,243
METHOD OF TREATING MEAT AND BONE
Harry J. Robertson, Chicago, Ill., and Henry Frank, Abraham A. Alterman and Bennett N. Oxman, Atlanta, Ga., assignors to International Meat Processors, Inc., Atlanta, Ga., a corporation of Delaware
Filed Aug. 10, 1959, Ser. No. 832,578
6 Claims. (Cl. 99—107)

This invention relates to food products and is more particularly concerned with a method of treating meat and bone so as to remove the bone and produce a bone-free raw meat product.

In prior processes of producing a bone-free meat product, the bone with meat thereon was cooked for an appreciable length of time to loosen the meat from the bone. Subsequently, the meat and bone were comminuted, then commingled with water and centrifuged to separate the bone from the remaining slurry.

In such a process, the meat, of necessity, had to be cooked and hence the meat was sold as a cooked meat product. While the process described above has been commercially successful, it will readily be understood that a process whereby the raw, uncooked or uncoagulated meat is quickly and easily separated from the bone would have much wider application.

Accordingly, we have devised a process wherein the long and time consuming cooking step is eliminated. The resulting bone-free meat product is extremely versatile and has much more varied use since it is still in essentially an uncoagulated condition and may be molded into predetermined shapes in post treatment as desired. The binders present in the uncooked meat product adapt the product to uses for which the cooked product of prior art would not be well suited because such binders are destroyed in the cooking process. For example, the uncooked product of the present invention may be employed in producing sausages, wieners, meat balls and loaves. Further, since the meat product of the present invention is in an uncooked condition, it still contains many of the juices and solutes which impart flavor to soups, broths, stews and the like.

By the elimination of the necessity of cooking the product of the present invention, it may be packaged and frozen without intermediate cooling.

Briefly, the present invention includes the step of reducing portions of a carcass in uncooked state to relatively small size, with simultaneous and/or subsequent mechanical detaching or severing of the meat from the bone. For this purpose one or more suitable grinders, breakers, disintegrators or mills may be employed, provided that the material is so worked mechanically during this operation and/or subsequently as required, as to scrape, rub off, scrub or tear the meat from the bone, the bone being reduced to small particle size, renders the meat in a divisible condition from the bone. During this operation or subsequently the water content of the mass is adjusted to a suitable level to produce a fluidized mass of separated meat admixed with fragmented bone, and this mixture is fed to a centrifuge wherein the mixture is stratified into a heavier stratum of bone particles and a lighter stratum of fluidized meat, and these strata separated from each other. With relatively smaller percentages of total water present in the mass of finely divided meat and bone, the entire stratum of meat separated in the centrifuging operation may be packaged as the meat product. With larger percentages of total water present, it may be found advisable at times to filter, centrifuge or decant excess water from the meat in a subsequent step.

It is an object, therefore, of the present invention to provide a method for treating a carcass portion to obtain a bone-free meat product in an essentially uncooked condition.

Another object of the present invention is to provide a continuous process wherein uncooked carcass portions are treated to remove the edible portions therefrom.

Another object of the present invention is to provide an economical and efficient process of treating raw carcass portions to provide a bone-free meat product.

Another object of the present invention is to provide a method of treating carcass portions to remove the edible portions therefrom in essentially an uncooked and uncoagulated condition, suitable for molding into a variety of meat products.

Another object of the present invention is to provide a process of separating raw meat from bone which is much more quickly and easily performed than prior art processes.

Other and further objects, features and advantages of the present invention will become apparent from the following description when taken in conjunction with the accompanying drawings wherein like characters of reference designate corresponding parts throughout the several views, and wherein:

FIG. 1 is a schematic diagram of apparatus employed in carrying out the process of the present invention.

FIG. 2 is an enlarged fragmentary view of the centrifuge of the apparatus of FIG. 1, portions thereof being broken away to disclose the interior of the centrifuge.

Figure 3:
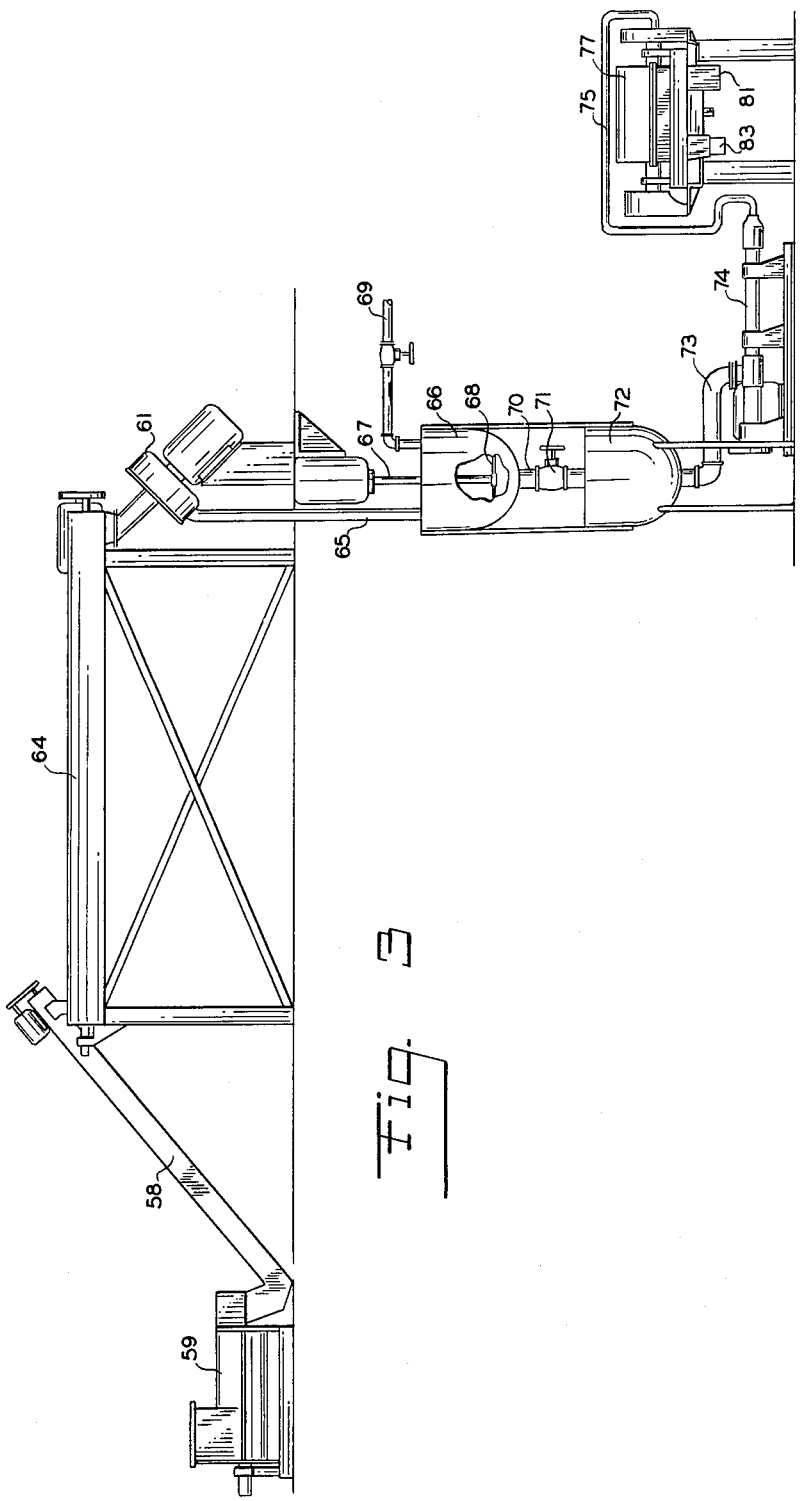
FIG. 3 is a schematic diagram of a modified form of apparatus employed in carrying out the process of the present invention.

While the present invention is applicable to substantially any meat carcass or carcass portion wherein it is desired to remove the edible meat parts from the bone, it is particularly suited to removal of the meat from fouls, such as chickens and especially chicken necks or other portions which are not normally considered as particularly desirable portions of the carcass and may be employed for removing edible meat portions from parts of other animals, e.g., lamb, beef, pork and bone-containing marine life such as whale, fish and the like.

Referring now in detail to the accompanying drawings and in particular to FIG. 1 thereof, the carcass portions to be processed are first fed to the hopper of a pre-breaker 9 where the meat and bone of the carcass are moved axially of the main shaft thereof and are engaged by radially protruding blades which chop or break the carcass portions into a particle size such that all portions pass through a three-fourth inch opening. Thence, the chopped portions of the carcass pass through a pipe or tube 10 to disintegrator 11 where the portions of meat and bone are reduced still further in size such that all portions pass through a quarter inch opening.

At this stage, the meat-bone mixture may be somewhat lumpy and not in optimum condition for centrifuging even though a portion of the meat has been entirely separated from the bone particles. The meat-bone mixture is then fed through a discharge pipe 12 to one end of a conveyor or trough 13 having a helical screw 14 axially disposed therein. The screw conveyor 14 is operated at such a speed that the meat and bone mixture is tossed and tumbled as it is moved from the entrance end of the conveyor 13 to the discharge end thereof. In this process of mechanical working or attrition, the shearing force of particle against particle and of particle against apparatus or mechanism tends to scrub, rub or scrape off the remaining meat still adhering to the bone particles as the mixture is conveyed by the screw conveyor 13, such that the bone in the mixture as delivered to the discharge end of the conveyor 13 is essentially free of edible meat. The bone particles preferably are of a size such that on an average the largest dimension of a particle is at least about 1/64 inch and less than about 1/4 inch, the optimum between about 1/16 inch and being 3/16 inch, e.g. about 1/8 inch. Thus, neither the bone nor the meat is reduced to a semi-colloidal or colloidal size.

Thence, the heterogeneous mixture of meat and essentially clean bone is delivered through a pipe 15 to a mixing vat 16. The mixing vat 16 is provided with a suitable agitator such as a rotating shaft 17 having on its end a paddle or propeller blade 18. A measured amount of liquid, as water, is introduced through pipe 19 into vat 16 so as to be commingled and admixed with the heterogeneous mixture from conveyor 13 to form a pumpable slurry.

When the slurry is thoroughly mixed, a large gate valve 20, in a pipe 21 extending from the bottom of vat 16 to the top of accumulator vat 22, is opened and the slurry flows into the accumulator vat 22. A pipe 23 leading from the bottom of accumulator vat 22 feeds the slurry to the inlet of a pump 24, e.g. a Moyno pump such as disclosed in the U.S. Patent No. 2,796,029, and discharged therefrom into pipe 25.

Figure 8:
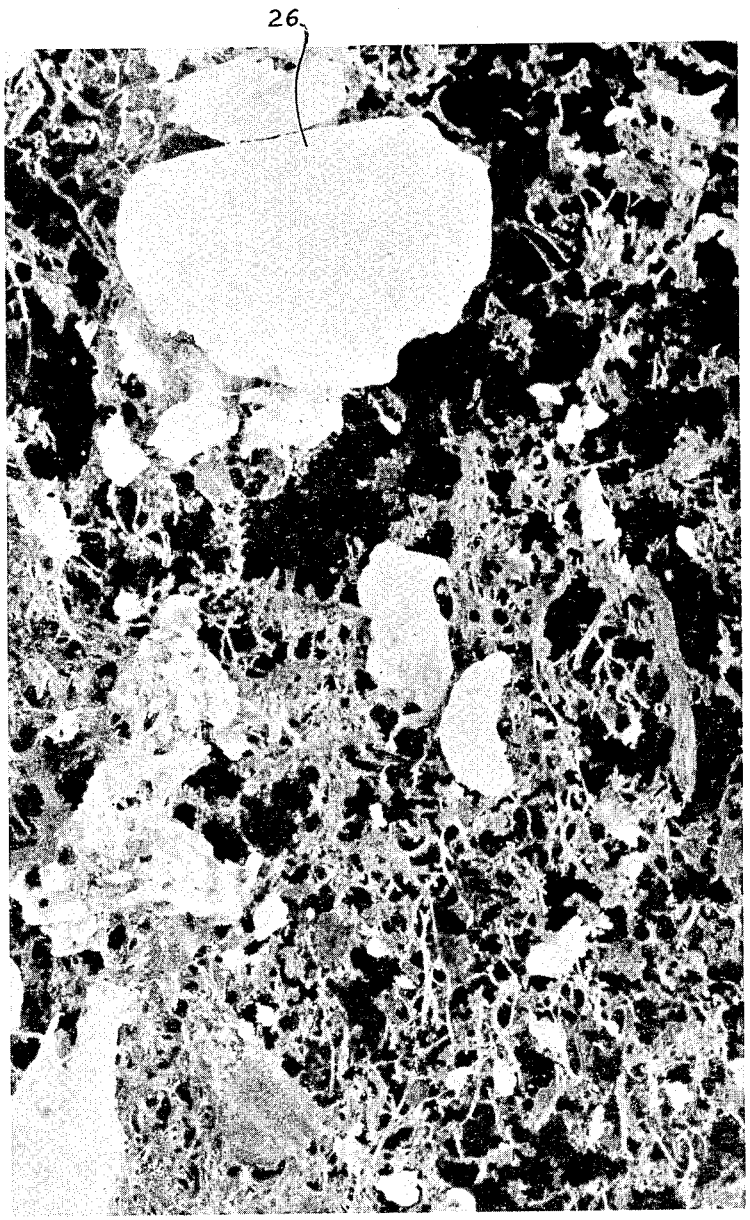
FIG. 8 is a photomicrograph of the mixture of meat and bone produced when chicken necks are reduced to finely divided form and water has been added according to the present invention.

In the pump 24 the bone is subjected to further attrition or scrubbing action with the slurry being compressed so that a more forceful scrubbing action takes place with the liquid component of the slurry penetrating the crevices in the bone to aid in removing adhering particles of meat. At this stage, the slurry has an appearance similar to the mixture shown in FIG. 8, the bone particles 26 being in large part clean of all adhering material.

From the pipe 25, the slurry is delivered axially into a continuous solids-discharge centrifuge 27, such as shown in U.S. Patent No. 2,679,974. This centrifuge 27 is operated at a speed to provide a centrifugal force of from say 200 to 3000 times gravity whereby two layers are formed, one of bone deposited on the inner wall of bowl 28, and the other of a mixture of meat and water disposed radially rearwardly of the layer of bone. The spiral impeller blade 29 urges the bone to the right in FIG. 2. Thus, the bone is discharged through port 30 and pipe 31 and the meat as part of the liquid component is discharged through port 32 and pipe 33. If desired, longitudinal ribs 34, or their equivalent e.g. longitudinal grooves, may be provided on the inner periphery of bowl 28 so as to aid in guiding the bone particles axially of the centrifuge 27 toward port 30. Without the ribs 34, the bone may in some instances tend to slide around the periphery of the blade 29 with less efficient operation of the centrifuge.

It will be observed that the port 32 is positioned radially outwardly of the port 30 and that the rotating blade 29 propels the bone longitudinally and radially inwardly toward port 30. The meat, being slippery and fluidized, slides around the blade 29 and hence overflows through port 32, being displaced by the incoming slurry from pipe 25.

As is well known, ports 30 and 32 may each be of any desired number spaced circumferentially of bowl 28.

After the meat product comprising water and meat is recovered, it may be further centrifuged or filtered to remove any excess liquid, if desired. We have found, however, that even with excessive liquid, the meat product of the present invention is very useful as an ingredient of sausage, soups, broths and meat loafs, particularly where, normally, water would be added in the process of their preparation. When the meat product of the present invention is employed in producing such an end product, a smaller proportion of make up liquid, as water, would be required.

In FIG. 3, the modified form of apparatus employed includes the pre-breaker 59, the disintegrator 61, feeding through pipe 65 to the mixing vat 66 having shaft 67 provided with paddle 68 and discharging into accumulator vat 72 through valve 71 in pipe 70. Water is introduced through pipe 69 into vat 66. The pump 74 pumps the slurry from vat 72 via pipe 73 to pipe 75 into the centrifuge 77 whence the slurry is separated into the meat product passing out through pipe 83 and the bone passing out of pipe 81. All of the above apparatus are arranged and function in substantially the same manner as the corresponding apparatus of the previously described structure. In this embodiment of our invention, however, the pre-breaker 59 discharges to the lower end of an inclined worm conveyor 58. The worm conveyor 58 then discharges into a horizontal screw and trough conveyor 64 which is substantially identical to conveyor 13. Thus, mechanical working of the finely divided meat and bone is accomplished prior to the time this mixture is fed to the disintegrator 61.

Figure 4:
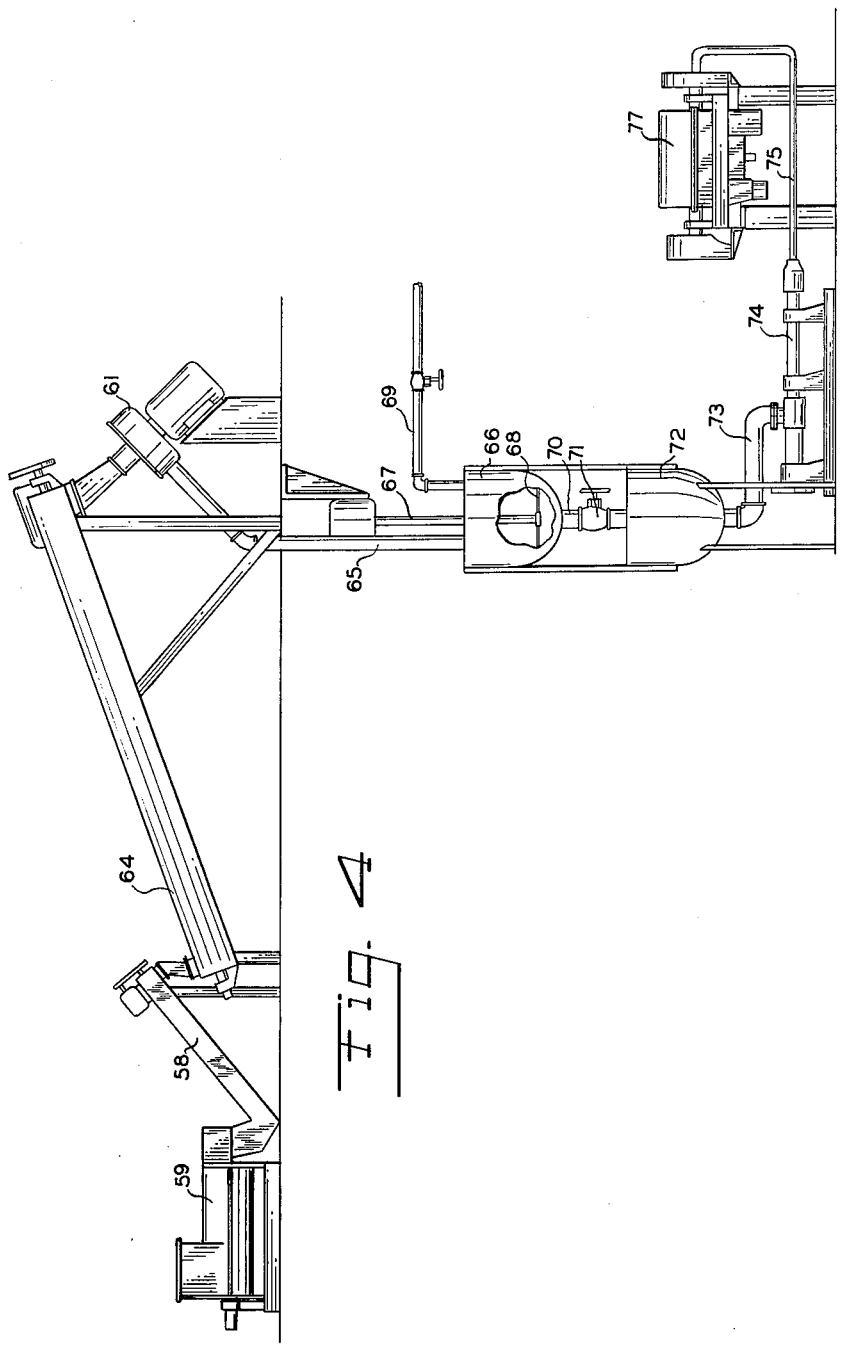
FIG. 4 is a schematic diagram of still another modified form of apparatus employed in carrying out the process of the present invention.

In FIG. 4, the apparatus of FIG. 3 is illustrated except that the screw and trough conveyor 64 is inclined so that additional working of the meat and bone mixture is accomplished as the mixture is conveyed and agitated by conveyor 64.

It will be understood for practical purposes and depending upon design and construction, sufficient mechanical working of the mass may be accomplished in the pre-breaker 9 or 59 and/or in the disintegrator 11 or 61 during and/or subsequent to the reduction of the bone to a finely divided state. In such cases, the conveyors 13, 58 and 64 as well as the pumps 24 and 74 may be dispensed with and the material, as received from the disintegrator 61 fed, e.g. by gravity, direct to the centrifuge with sufficient additional water to form a semi-solid mass or slurry, although pumps comprise convenient and efficient means for feeding slurries to centrifuges. This is particularly true of the Moyno pump which provides a constant uniform flow.

Also, while the water may be added to the mixture of bone and meat after the bone and meat have been reduced to small particle size, the water may be added at substantially any stage of processing prior to the time it reaches the centrifuge 27 or 77.

Figure 5:
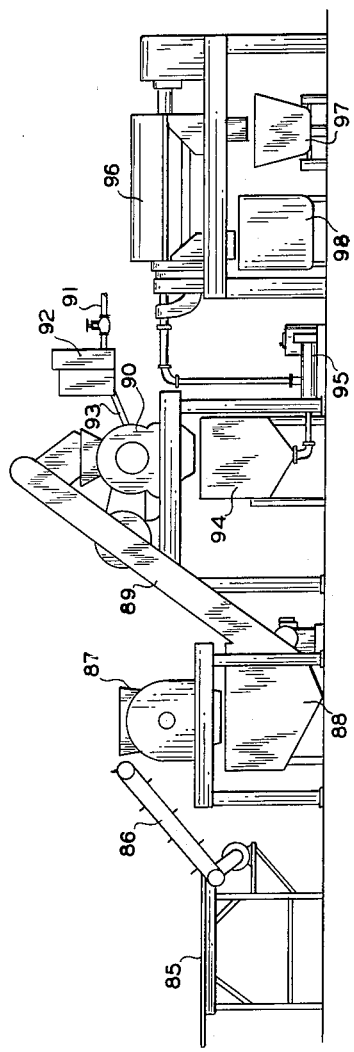
FIG. 5 is a schematic diagram of a compact arrangement of apparatus for carrying out the process of the present invention.
Figure 6:
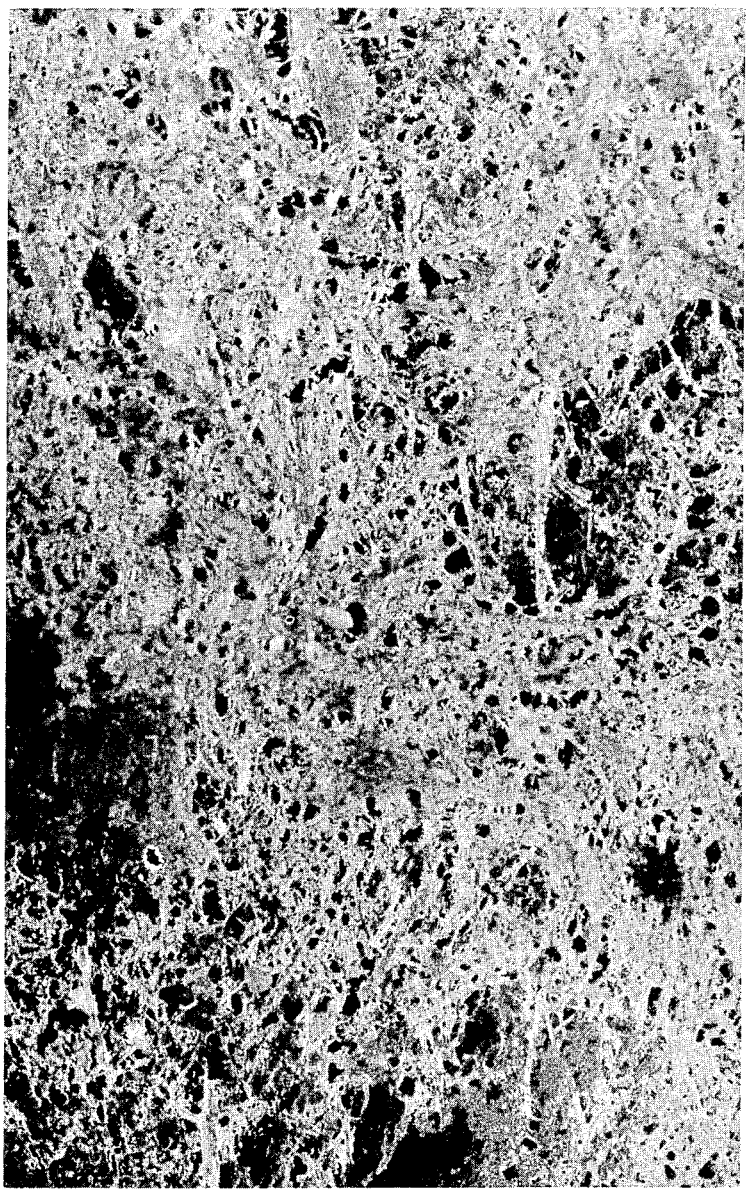
FIG. 6 is a photomicrograph of the meat product of FIG. 8 procured when chicken necks are processed according to the present invention.
Figure 7:
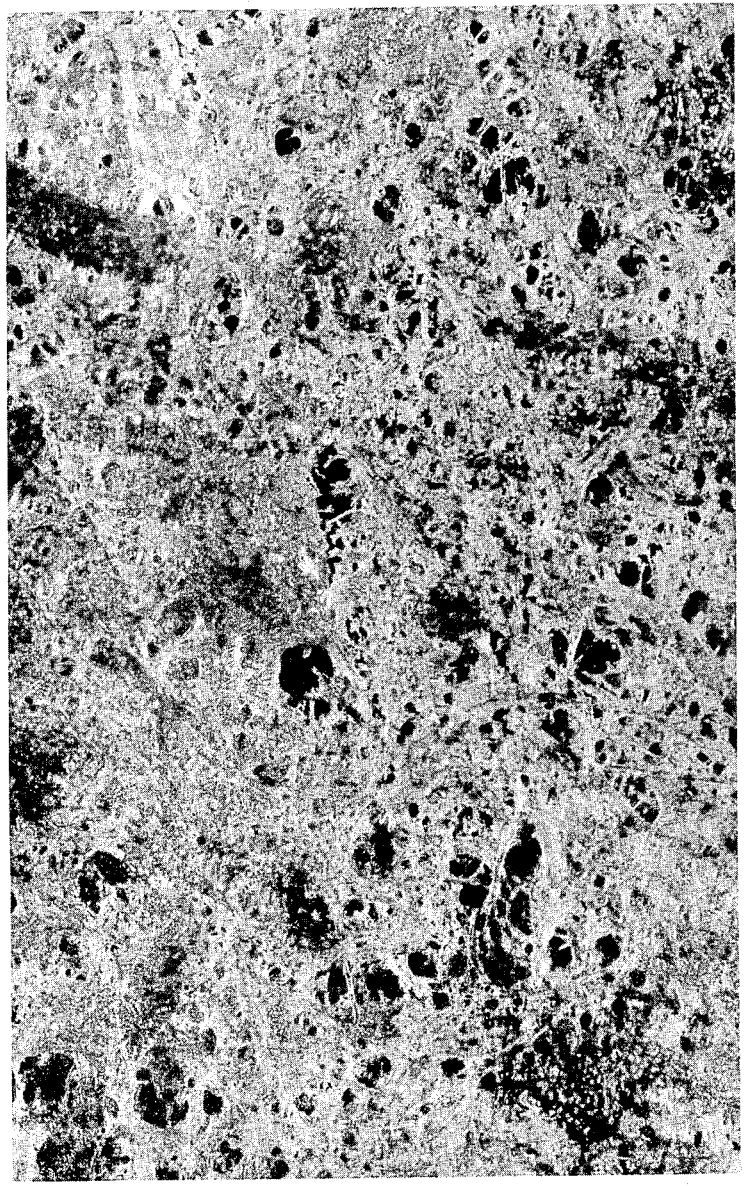
FIG. 7 is a photomicrograph of raw meat picked by hand in the usual fashion from the neck of a chicken.

These features are illustrated in FIG. 5 wherein 85 is an inspection table, 86 a conveyor, 87 a coarse grinder, 88 a catch tank for grinder 87, 89 a conveyor, 90 a fine grinder or comminutor, 91 a source of water leading through ratio controller 92 and line 93 to comminutor 90, 94 a catch tank for comminutor 90, 95 a feed pump for centrifuge 96, 98 a bone receiver for centrifuge 96, and 97 a deboned meat receiver for centrifuge 96.

In operation the material to be processed is delivered to inspection table 85 from which, after inspection, it is fed to conveyor 86. The material is delivered by conveyor 86 to coarse grinder 87, the coarse ground material falling into catch tank 88 from which it is conveyed by conveyor 89 to fine grinder 90. Water to produce the desired slurry is added directly to fine grinder 90 from source 91, controller 92 maintaining the desired ratio of water to the mass undergoing treatment.

The slurry produced in fine grinder 90 falls into catch tank 94 from which it is pumped by pump 95 to centrifuge 96 wherein the slurry is separated into bone and deboned meat which are collected in receivers 98 and 97, respectively.

An outstanding feature of the apparatus of FIG. 5 resides in the mechanical working of the mass for the purpose of severing or detaching the meat from the bone substantially entirely in the coarse grinder 87 and the fine grinder 90, conveyors or feeders 86 and 89 functioning in very large part merely as conveyors, although attrition or other mechanical working during such conveying obviously may take place.

The amount of water to be added to the finely divided mixture of bone and meat of course varies because of varying amounts of residual moisture present in the raw material used. Based on the dry weight of total solids present other than fat, the total water or moisture in the slurry at the time of centrifuging should be such that the dry weight of total solids present other than fat falls between 10% and 30% by weight, and preferably between 15% and 20% by weight. In other words, the moisture is adjusted in the slurry so that the resulting slurry contains by weight between 10% and 30% bone and meat solids other than fat, taken on a dry basis, and preferably between 15% and 20%, although some departure might be tolerated.

It will be understood that the entire process hereinbefore described need employ no heat and hence the oils and fats may remain in their original condition. Also, the protein remains uncoagulated in the resulting meat product. We have found that even frozen carcass portions may be processed according to the present invention with the meat and edible portions being removed from the bone while the meat is still frozen. Thus, little detrimental re-freezing of the meat would be involved. The carcass may be processed according to the present invention where the temperature of the carcass varies from 0° F. up to 120° F. Temperatures in the neighborhood of 120° F., e.g. above 115° F., are not recommended, however, since the meat product in some instances may be considered as semi-cooked.

Utilizing the present process, about 100,000 pounds of carcass may be processed in an eight hour day using a single unit as described.

A better understanding of the present invention will be had by reference to the following examples.

*Example I*

Two hundred pounds of raw chicken necks in a frozen condition were loaded into a grinder known in the trade as a "Buffalo Grinder" having a ½ inch plate and the machine was operated two minutes to discharge the ground chicken necks. Next the ground chicken necks were loaded into a similar Buffalo grinder having a ⅛ inch plate and this grinder operated for one minute to discharge the finely divided chicken necks. Thereafter, seventy-one pounds of water was added to the finely divided chicken necks in a vat while maintaining the temperature at from 62° F. to 66° F. The slurry thus produced was recirculated by means of a "Moyno pump, 1L6, Sanitary" for approximately two minutes and then charged rapidly into a "Sharples P. 1000" centrifuge. The pond dam setting of the centrifuge was No. 2 and the centrifuge was rotated at 1800 r.p.m. to provide a centrifugal force of 650 times the force of gravity on the material furtherest from the axis. The pressure of the Moyno pump feeding to the centrifuge was maintained at 60 to 70 p.s.i., the pressure on the feed as it entered the centrifuge being substantially atmospheric. An analysis of the resulting meat product recovered from the centrifuge was as follows:

|  | Percent |
|---|---|
| Bone | 0.00 |
| Moisture | 78.61 |

*Example II*

One hundred-nine pounds of front quarter fresh raw beef was fed through a grinder known in the trade as a "Buffalo Grinder" having a ¼ inch plate for pre-breaking and then to a second "Buffalo Grinder" having a ⅛ inch plate for fine grinding. Next the mixture of bone and meat was placed in a vat and sixty-six pounds of water was added to the mixture as it was recirculated by a "Moyno 1L6" pump under a pressure of 60 p.s.i. and at a temperature of from 65° F. to 70° F. When the water bone and meat appeared to have a constant consistency it was pumped rapidly by the pump at 60 p.s.i. to the "Sharples P. 1000" centrifuge, the pressure on the feed as it entered the centrifuge being substantially atmospheric. The centrifuge was operated with a No. 2 pond dam setting at 1800 r.p.m. such that the material at the greatest radius from the axis was subjected to 650 times the force of gravity. An analysis of the resulting meat product recovered from the centrifuge was as follows:

|  | Percent |
|---|---|
| Bone | 0.00 |
| Moisture | 72.04 |

*Example III*

The process of Example II was repeated using two hundred pounds of raw fresh sheep fronts with one hundred-forty pounds of water being added after the bone and meat was reduced to finely divided form. A setting of No. 1 was placed on the pond dam and a temperature of 68° F. was maintained for the material entering the centrifuge. The resulting product analyzed:

|  | Percent |
|---|---|
| Bone | 0.00 |
| Moisture | 79.40 |

*Example IV*

The process of Example II was repeated using two hundred-thirteen pounds of fresh raw lamb chucks. One hundred-twenty eight pounds of water was added after the meat and bone was reduced to finely divided form. The pressure of the pump was maintained at 55–65 p.s.i. and the temperature of the mixture as fed into the centrifuge was 69° F. The centrifuge was run with a No. 1 pond dam setting. The resulting meat product analyzed:

|  | Percent |
|---|---|
| Bone | 0.00 |
| Moisture | 73.49 |

*Example V*

The process of Example I was repeated using two hundred pounds of partially frozen raw chicken necks. Sixty seven pounds of water was added to the finely divided meat and bone and a pump pressure of from 70 p.s.i. to 80 p.s.i. was maintained. The water and meat and bone required two minutes to mix and the centrifuge was operated with a pond dam setting of No. 1. The resulting product was of high quality with no bones.

*Example VI*

The process of Example I was repeated using two hundred pounds of frozen raw chicken necks from hens which were unusually large and fat. One hundred pounds of water was added to the finely divided meat and bone. The pumping pressure was 60 p.s.i. and the temperature of the mass as fed to the centrifuge was 62° F. The centrifuge was operated at 3240 r.p.m. to provide a centrifugal force of 2100 times gravity on the material furtherest from the axis of rotation. The resulting product was of good quality, free from bone.

*Example VII*

Two hundred pounds of raw frozen chicken necks were charged into a "Buffalo Grinder" having a ½ inch plate and thence fed to a similar "Buffalo Grinder" having a ⅛ inch plate. Thereafter the material was fed to a "Prague Mince Master" where the material was reduced to a size having the largest diameter of 1/16 inch. Eighty pounds of water was then added to the material and thoroughly mixed therewith and mechanically worked using a Moyno pump while maintaining the temperature at 68° F. The pumping pressure of the pump during recirculation was from 40 p.s.i. to 50 p.s.i. The mass of meat, bone and water was then charged at about one-third the previous rates into a "Sharples P.1000" centrifuge using the pump. The centrifuge was operated at 3240 r.p.m. with a pond dam setting of No. 1. The slower rate of flow enabled the material to remain in the centrifuge longer. An analysis showed, bone—0.00%.

*Example VIII*

The process of Example I was repeated using exceptionally fat necks of hens and roosters. The bone analysis of the resulting product was 0.00%.

*Example IX*

The process of Example I was repeated using one hundred pounds of exceptionally fat and large necks of hens and roosters. Forty pounds of water was added to the meat and bones and the thoroughly mixed material was fed slowly to the centrifuge with a No. 1 pond dam setting. Analysis showed 0.00% bone.

*Example X*

One hundred-fifty pounds of frozen raw chicken necks were processed through a "Buffalo Grinder" with a ¾ inch plate and thence through a Fitzpatrick "Fitzmill" having a screen with ⅛ inch openings. Thirty pounds of water were added to the bone and meat and the mixture agitated with a hand paddle. Thereafter the material was fed to a centrifuge rotating at 1800 r.p.m. with a pond dam setting of No. 3. An analysis of the product showed:

| | | Dry basis |
|---|---|---|
| Moisture percent | 73.70 | |
| Fat do | 12.78 | 48.58 |
| Protein do | 13.11 | 49.86 |
| Crude Fiber do | .31 | 2.72 |
| N.F.E | none | none |
| Calcium (Ca) percent | .076 | .29 |
| Phosphorous (P) do | .158 | .60 |
| Flourine (F) p.p.m | less than 1 | less than 4 |
| Claculated bone percent | .18 | .7 |

Having particularly described the invention, it is to be understood that this is by way of illustration and not of limitation, and that changes, omissions, additions, substitutions or other modifications may be made without departing from the spirit thereof. It is therefore intended that the patent shall cover, by suitable expression in the claims, the various features of patentable novelty that reside in the invention.

We claim:

1. A process for the recovery of bone-free uncooked meat from a mass of meat bearing animal bone, the protein of said meat being in uncoagulated raw state, which comprises reducing said bone to fragments and mechanically working said bone and fragments to loosen meat therefrom to finely subdivide said mass into particles of sizes which on average range between about ¹⁄₆₄" and about ¼", fluidizing the fragmented mass by the addition of water at a temperature below about 120° F., said added water being in amount such that the total fat-free dry solids fall between 10% and 30% by weight of the sum of the weights of the fat-free solids and the total water preseent, passing the fluidized mass in mixed state to a locus of centrifugal force to produce a stratum of fluidized bone-free meat and a stratum of bone fragments, conveying the stratum of bone fragments longitudinally relative to said first-mentioned stratum to a zone of discharge and there discharging the same from said locus of centrifugal force, and discharging the stratum of fluidized meat from said locus of centrifugal force at a zone of discharge spaced both radially outwardly and longitudinally from the zone of discharge of bone fragments.

2. The method of producing bone-free raw meat and meat-free bone from a mass of bony meat and in which the raw meat is adherent to the bony structure therein, which comprises, fragmenting and mechanically working said mass to loosen the raw meat from the resultant bony fragments while reducing said raw meat and said bony fragments to small particle sizes with said bone fragments reduced to particle sizes with minimum dimensions above about ¹⁄₆₄" and maximum dimension below about ¾ of an inch, adding liquid during said fragmenting and mechanical working of said meat from said bony fragments in amount to fluidize to a flowable mixture said fragmented mass with the temperature of said mass below about 120° F., said liquid added during said fragmenting and mechanically working being in amount such that the total fat-free dry solids falls between 10% and 30% by weight of the sum of the weights of the fat-free solids and the total liquid present, and supplying said flowable mixture of raw meat, crushed bone, and said liquid while at a temperature below about 120° F. at a steady feed rate to a locus of centrifugal force for developing thereby a heavier stratum consisting of bone fragments and a lighter stratum radially displaced from said heavier stratum consisting substantially exclusively of fluidized bone-free raw meat, and separately discharging from said locus of centrifugal force said bone-free raw meat and said bone fragments.

3. The method of producing bone-free meat and meat-free bone from a mass of bony meat and in which the raw meat is adherent to the bony structure therein, which comprises, fragmenting and mechanically working said mass to loosen the raw meat from the resultant bony fragments while reducing said raw meat and said bony fragments to particle sizes above about ¹⁄₆₄" and below about ¾ of an inch, adding liquid in amount to fluidize to a flowable stream said fragmented mass with the temperature below about 120° F., said added liquid being in amount such that the total fat-free dry solids fall between 10% and 30% by weight of the sum of the weights of the fat-free solids and the total liquid present, and supplying said flowable mixture of raw meat, crushed bone, and said liquid while at a temperature below about 120° F. at a steady feed rate to a locus of centrifugal force for developing thereby a first stratum consisting of bone fragments and a second stratum radially displaced from said first stratum consisting substantially exclusively of fluidized bone-free meat, and separately discharging from said locus of centrifugal force said bone-free raw meat and said bone fragments.

4. The method of claim 3 wherein said bony meat comprises chicken necks.

5. The method of producing bone-free meat and meat-free bone from a mass of bony meat and in which the raw meat is adherent to the bony structure therein, which comprises, fragmenting and mechanically working said mass to loosen the raw meat from the resultant bony fragments while reducing said mass to particle sizes above about ¹⁄₆₄" and below about ¾ of an inch, adding liquid in amount to fluidize to a flowable stream said fragmented mass with the temperature of said mass below about 120° F., supplying said flowable mixture of raw meat, crushed bone, and said liquid while at a temperature below about 120° F. at a steady feed rate to a locus of centrifugal force for developing thereby a first stratum consisting of bone fragments and a second stratum radially displaced from said first stratum consisting substantially exclusively of fluidized bone-free meat, discharging from said locus of centrifugal force said fluidized bone-free raw meat, and bodily moving said stratum of said bone fragments axially of said locus of centrifugal force and radially inwardly thereof for discharge from said locus of said bone fragments at a point spaced from the discharge of said fluidized bone-free meat.

6. The method of claim 5 in which said mass of bony meat comprises raw chicken necks.

References Cited in the file of this patent
UNITED STATES PATENTS

| | | |
|---|---|---|
| 2,600,867 | Gerritsen | June 17, 1952 |
| 2,734,540 | Geisler | Feb. 14, 1956 |
| 2,799,584 | Robertson | July 16, 1957 |
| 2,828,018 | Chayen | Mar. 25, 1958 |